United States Patent
Roberts

(10) Patent No.: US 7,532,202 B2
(45) Date of Patent: May 12, 2009

(54) BASELINING TECHNIQUES IN FORCE-BASED TOUCH PANEL SYSTEMS

(75) Inventor: Jerry B. Roberts, Arlington, MA (US)

(73) Assignee: 3M Innovative Properties Company, Saint Paul, MN (US)

( * ) Notice: Subject to any disclaimer, the term of this patent is extended or adjusted under 35 U.S.C. 154(b) by 1432 days.

(21) Appl. No.: 10/142,118

(22) Filed: May 8, 2002

(65) Prior Publication Data
US 2003/0210235 A1 Nov. 13, 2003

(51) Int. Cl.
*G09G 5/00* (2006.01)

(52) U.S. Cl. .................... 345/173; 178/18.01

(58) Field of Classification Search ......... 345/173–179; 178/18.01–18.08; 341/34; 382/313–314
See application file for complete search history.

(56) References Cited

U.S. PATENT DOCUMENTS

| | | | |
|---|---|---|---|
| 3,657,475 A | 4/1972 | Peronneau et al. | |
| 4,089,036 A | 5/1978 | Geronime | |
| 4,121,049 A | 10/1978 | Roeber | |
| 4,340,777 A | 7/1982 | DeCosta et al. | |
| 4,355,202 A | 10/1982 | DeCosta et al. | |
| 4,389,711 A | 6/1983 | Hotta et al. | |
| 4,484,179 A | 11/1984 | Kasday | |
| 4,495,434 A | 1/1985 | Diepers et al. | |
| 4,511,760 A | 4/1985 | Garwin et al. | |
| 4,542,375 A | 9/1985 | Alles et al. | |
| 4,550,384 A | 10/1985 | Kimura | |
| 4,558,757 A | 12/1985 | Mori et al. | |
| 4,675,569 A | 6/1987 | Bowman et al. | |
| 4,697,049 A | 9/1987 | Peemoller et al. | |
| 4,745,565 A | 5/1988 | Garwin et al. | |
| 4,771,277 A | 9/1988 | Barbee et al. | |
| 4,775,765 A | 10/1988 | Kimura et al. | |
| 4,816,811 A | 3/1989 | Bogatin et al. | |
| 4,875,378 A | 10/1989 | Yamazaki et al. | |
| 4,893,115 A | 1/1990 | Blanchard | |
| 4,918,262 A | 4/1990 | Flowers et al. | |

(Continued)

FOREIGN PATENT DOCUMENTS

EP 0 388 344 9/1990

(Continued)

OTHER PUBLICATIONS

"Force Concentrator For Touch Sensitive Panel Using Snap-Action Switches", IBM Technical Disclosure Bulleting #NN7606238, vol. 19, Jun. 1976.

(Continued)

*Primary Examiner*—Abbas I Abdulselam
(74) *Attorney, Agent, or Firm*—Steven A. Bern

(57) ABSTRACT

In connection with establishing a touch location on a touch screen, a number of reference levels are developed. One or more of the reference levels may be used to determine a differential change in the touch signal between a zero touch force condition and a touch event. In one approach, one or more reference levels are selected to compensate for various conditions affecting the touch screen at the time a touch is applied. Using one or more reference levels to compensate for conditions affecting the touch signal at the time touch location information is obtained can provide improved accuracy in determining touch location.

13 Claims, 12 Drawing Sheets

U.S. PATENT DOCUMENTS

| | | | |
|---|---|---|---|
| 4,983,787 A | 1/1991 | Kunikane | |
| 5,038,142 A | 8/1991 | Flowers et al. | |
| 5,060,066 A | 10/1991 | Roberts | |
| 5,072,076 A | 12/1991 | Camp, Jr. | |
| 5,241,308 A | 8/1993 | Young | |
| 5,376,948 A | 12/1994 | Roberts | |
| 5,541,372 A | 7/1996 | Baller et al. | |
| 5,543,588 A | 8/1996 | Bisset et al. | |
| 5,543,591 A | 8/1996 | Gillespie et al. | |
| 5,563,632 A | 10/1996 | Roberts | |
| 5,565,658 A * | 10/1996 | Gerpheide et al. | 178/18.02 |
| 5,708,460 A | 1/1998 | Young et al. | |
| 5,714,694 A | 2/1998 | Diessner | |
| 5,777,596 A * | 7/1998 | Herbert | 345/104 |
| 5,790,107 A * | 8/1998 | Kasser et al. | 345/174 |
| 5,854,625 A | 12/1998 | Frisch et al. | |
| 5,943,043 A | 8/1999 | Furuhata et al. | |
| 6,108,211 A | 8/2000 | Diessner | |
| 6,285,358 B1 | 9/2001 | Roberts | |
| 6,366,866 B1 * | 4/2002 | Kanagawa et al. | 702/95 |
| 6,504,530 B1 * | 1/2003 | Wilson et al. | 345/173 |
| 2002/0039092 A1 | 4/2002 | Shigetaka | |

FOREIGN PATENT DOCUMENTS

| | | |
|---|---|---|
| EP | 0 531 815 | 3/1993 |
| JP | 61148522 | 12/1984 |
| WO | WO 02/35461 | 5/2002 |

OTHER PUBLICATIONS

"Touch-Sensitive Pancake", IBM Technical Disclosure Bulleting #88A61790, Oct. 1998.

* cited by examiner

BASELINING TECHNIQUES IN FORCE-BASED TOUCH PANEL SYSTEMS

FIELD OF THE INVENTION

The present invention is directed generally to a touch sensor, and more particularly to a method and system for accurate determination of a touch location on a touch screen.

BACKGROUND

A touch screen offers a simple, intuitive interface to a computer or other data processing device. Rather than using a keyboard to type in data, a user can transfer information through a touch screen by touching an icon or by writing or drawing on a screen. Touch screens are used in a variety of information processing applications. Transparent touch screens are particularly useful for applications such as cellphones, personal data assistants (PDAs), and handheld or laptop computers.

Various methods have been used to determine touch location, including capacitive, resistive, acoustic and infrared techniques. Touch location may also be determined by sensing the force of the touch through force sensors coupled to a touch surface. Touch screens that operate by sensing touch force have several advantages over other technologies mentioned above. First, force sensors do not require the touch surface to be composed of special materials that may inhibit optical transmission through the touch surface, as in a resistive touch sensor. Further, force sensors do not rely on a lossy electrical connection to ground, as required by a capacitive touch screen, and can be operated by a finger touch, gloved hand, fingernail or other nonconductive touch instrument. Unlike surface acoustic wave technology, force sensors are relatively immune to accumulations of dirt, dust or liquids on the touch surface. Finally, a force sensor is less likely to detect a close encounter as an actual touch, which is a common problem with infrared touch screens.

Forces detected by touch screen force sensors reflect a variety of static and dynamic factors in addition to the touch force. These factors may be considered noise sources with respect to the touch signal. Noise may be introduced through the touch screen electronics, or it may be mechanical in nature. Electrical noise may be introduced, for example, in the sensor, amplifier, data conversion or signal processing stages. Mechanical noise may arise from torsion of the touch screen, movement of the touch screen device, vibration of the touch screen, and other transient factors. In addition, the touch screen force sensors may be affected by the weight of the touch surface and preloading forces applied to the force sensors during manufacture.

The touch force changes throughout the duration of a touch. A touch in a single location produces a touch force signal that increases as the touch is applied and then decreases as the touch is removed. The touch may also be moved across the surface of the touch screen, generating a dynamic touch signal at each force sensor. Accurate determination of touch presence and location requires analysis of force signals generated by the touch force, as well as elimination of the steady state and transient noise signals from various ancillary factors affecting the touch screen at a particular time.

SUMMARY OF THE INVENTION

In general terms, the present invention relates to a method and system for detecting the location of a touch on a touch sensor. The present invention is particularly useful when combined with a microprocessor-based system operating a display device enhanced by a transparent touch screen.

In accordance with one embodiment of the present invention, a method for determining a touch location of a touch on a touch screen involves acquiring a plurality of reference levels for a force responsive touch signal, selecting one or more of the plurality of reference levels based on information acquired from the touch signal, and determining touch location using the selected reference levels.

Another embodiment of the present invention includes developing a first and a second reference level for a force responsive touch signal and determining the touch location using at least one of the developed reference levels.

In accordance with another embodiment of the invention, a method for establishing a reference level for a touch signal includes sensing a quiescent touch signal prior to an application of a touch force, detecting a touch signal responsive to the application of the touch force, and establishing a reference level for the touch signal based on a value of the touch signal acquired contemporaneously with the detection of the touch force.

Another embodiment of the invention, a touch screen system includes a touch surface and a plurality of touch sensors physically coupled to the touch surface. Each of the touch sensors produces a sensor signal in response to a touch applied to the touch surface. A control system, coupled to the touch sensors, receives sensor signals and receives sensor signals, develops a plurality of reference levels for a force responsive touch signal, selects one or more of the plurality of reference levels based on information acquired from the touch signal, and determines the touch location using the selected reference levels.

Another embodiment of the invention is directed to a touch screen display system. In this embodiment, a touch screen display system includes a touch surface and a plurality of touch sensors physically coupled to the touch surface. Each of the touch sensors produces a sensor signal in response to a touch force applied to the touch surface. A control system, coupled to the touch sensors, receives sensor signals and receives sensor signals, develops a plurality of reference levels for a force responsive touch signal, selects one or more of the plurality of reference levels based on information acquired from the touch signal, and determines the touch location using the selected reference levels. The touch screen display system further includes a display for displaying information through the touch screen.

Another embodiment of the invention is directed to a display system including a touch screen system, a display for displaying information, and a processor coupled to the touch screen and the display for processing data displayed on the display and information received from the touch screen control system. The touch screen system includes a touch surface and a plurality of touch sensors physically coupled to the touch surface. Each of the touch sensors produces a sensor signal in response to a touch force applied to the touch surface. A control system, coupled to the touch sensors, receives sensor signals and receives sensor signals, develops a plurality of reference levels for a force responsive touch signal, selects one or more of the plurality of reference levels based on information acquired from the touch signal, and determines the touch location using the selected reference levels. The touch screen display system further includes a display for displaying information through the touch screen.

In accordance with a further embodiment of the invention, a system includes means for developing a plurality of reference levels for a force responsive touch signal and means for determining a location of a touch on a touch screen using one or more of the plurality of reference levels.

Yet another embodiment of the invention involves means for developing a first and a second reference level for a force responsive touch signal and means for determining touch location using at least one of the first or the second reference levels.

In accordance with another embodiment of the invention, a system for establishing a reference level for a touch signal includes means for sensing a quiescent touch signal prior to an application of a touch force, mans for detecting a touch signal responsive to the application of the touch force, and means for establishing a reference level based on a value of the touch signal acquired contemporaneously with the detection of the touch force.

In accordance with another embodiment of the invention, a computer-readable medium configured with executable instructions for causing one or more computers to perform a method of determining a location of a touch on a touch screen, the method including acquiring a plurality of reference levels for a force responsive touch signal, selecting one or more of the plurality of reference levels based on information acquired from the touch signal, and determining touch location using the selected reference levels.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
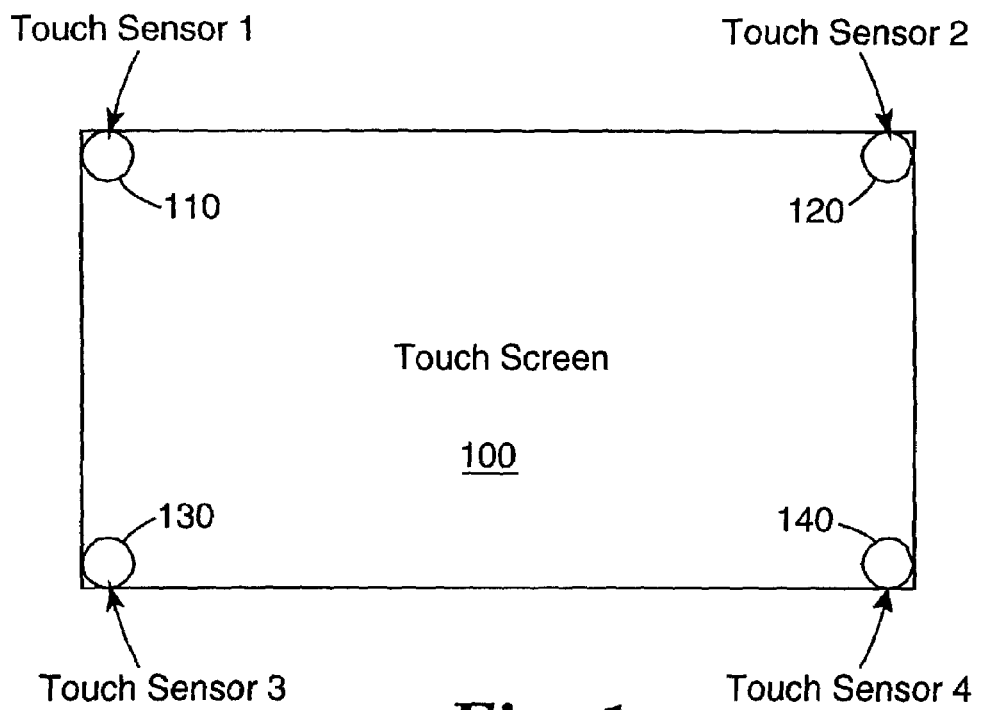
FIG. 1 schematically illustrates a top view of a touch screen with force sensors located at the corners of the touch screen in accordance with an embodiment of the invention.
Figure 2:
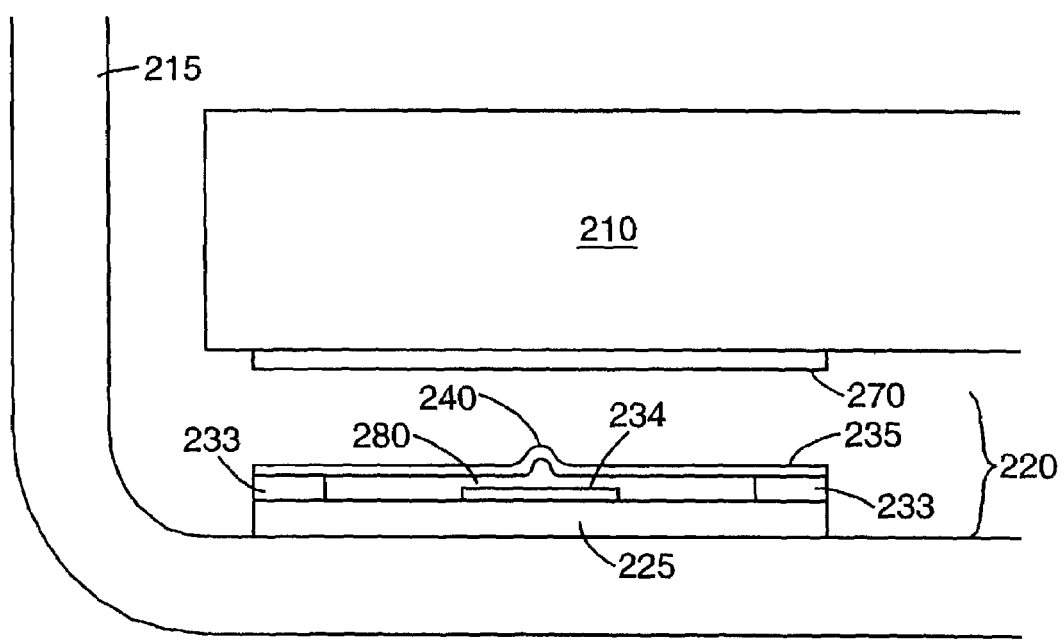
FIG. 2 schematically illustrates a cross-section view of a capacitive force sensor in accordance with an embodiment of the invention.

The invention is amenable to various modifications and alternative forms. Specific embodiments have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following description of the illustrated embodiments, references are made to the accompanying drawings that form a part hereof, and in which is shown by way of illustration, various embodiments by which the invention may be practiced. It is to be understood that other embodiments may be utilized, and structural and functional changes may be made without departing from the scope of the present invention.

As stated above, and for other reasons stated below which will become apparent upon reading the present specification, there is a need for a method and a system for rapid and accurate detection of the presence of a finger touch or an instrument touch on a touch surface to improve the determination of touch location for various touch types. There exists a further need for such a method and system that accurately detects the presence and location of a touch as the touch is moved across the touch pad.

The present invention is applicable to touch sensing techniques and is believed to be particularly useful when features of the invention are combined with a data processing system operating a display device enhanced by a transparent touch screen. For example, the touch screen of the present invention may be used in a desktop, handheld or laptop computer system, a point-of-sale terminal, personal data assistant (PDA), or a cell phone. Although described in combination with a microprocessor-based system, the touch screen device of the present invention may be combined with any logic-based system, if desired.

The present invention is directed to determining one or more touch signal reference values to improve the accuracy of touch location determination. A touch may be sensed by a number of touch sensors that produce force responsive sensor signals. A touch signal may be derived from a single sensor signal or by combining sensor signals from two or more force sensors. Accurate touch location determination involves measuring an increase in magnitude of one or more touch signals above a touch force reference amplitude, considered to represent a zero touch force condition.

Determination of the touch location involves analysis of touch signals produced by the touch screen sensors. Prior to the application of a touch, the touch signal remains at a quiescent level. A touch in a single location characteristically produces a touch signal that increases in magnitude when the touch is applied and then decreases in magnitude as the touch is removed. The rapid change in the touch signal indicates a touch presence. A touch may be a continuing touch wherein the touch remains on the touch surface for a period of time. For example, the touch may be present in a single location for a period of time. Further, the touch may be a "streaming touch," wherein the touch is applied at one location, moved across the surface of the touch screen, and removed at another location, causing the generation of a continuously changing signal at each sensor.

The touch signal may be affected by a variety of transient and steady-state noise components that prevent touch signal from remaining at a constant zero level during a quiescent period when no touch is present. Transient noise factors may include noise introduced in the touch screen electronics or by mechanical vibration, torsion or other motion of the touch screen. Steady-state noise factors may include, for example, preloading of the touch sensors or weight of the touch screen.

Noise components of the touch signal produce errors in touch location calculation. Errors affecting the accurate determination of the touch location may be categorized into three groups. First, error may arise from touch-independent noise. Touch-independent error arises from noise sources or disturbances not correlated with the touch itself, and can fluctuate unpredictably. Second, there may be static error in the reported touch location. Static touch location error is a reproducible function of the touch location and also of the steady-state force. Finally, dynamic touch location error may be introduced by the touch itself. Dynamic touch location error may occur during or immediately following a rapid change in the touch force.

Detection of a touch presence and location depends upon discerning a change in the touch signal caused by a touch force applied to the touch screen. Detection of a touch presence and determination of touch location depends upon measuring a differential change in the touch signal with respect to an established reference level representing a zero touch force condition. A touch signal may generally be affected by one or more errors, such as those described above, resulting in a non-zero touch signal for a zero touch force condition. The touch signal may be altered by long term effects, such as low frequency noise and long term drift. The touch signal may also be altered by short term effects constituting transient conditions, such as an operator squeezing or shaking the touch screen device.

Accurate touch location determination in accordance with the present invention, depends upon acquiring one or more touch signal reference levels representing a zero touch force condition. The reference levels are used to determine a differential change in the touch signal between a zero touch force condition and a touch event. According to the methods of the present invention, one or more touch signal reference levels representing a zero force condition are acquired and retained. The one or more touch signal reference levels represent a zero touch force reference level for purposes of the touch location calculation and may be selected to compensate for various conditions affecting the touch screen. By way of example, a first touch signal reference level may be used to compensate for low frequency noise and long term drift of the touch signal. A second touch signal reference level may be used to compensate for short term effects that may be present at the instant a touch event begins. Either the first or the second reference level, or both, may be selected for use in the touch location calculation based on the type or touch signal detected or expected. Selection of one or more reference levels to compensate for conditions affecting the touch signal at the time the touch location measurement is made can provide improved accuracy in determining touch location.

A generalized diagram of a touch screen is illustrated in FIG. 1. A touch surface 100 is arranged proximate to one or more touch force sensors. In the embodiment shown, the touch sensors 110, 120, 130, 140 are arranged at four corners of a rectangular touch surface. Although the touch screen illustrated in FIG. 1 is rectangular with sensors located at the corners, various configurations using three or more touch sensors with differing touch surface shapes may also be used.

The sensors, 110, 120, 130, 140, may be, for example, small capacitive force sensors constructed of two capacitor plates separated by a gap. A capacitive force sensor may be arranged so that when a touch force of sufficient magnitude and direction is applied to the touch surface, one capacitor plate deflects towards the second plate. The deflection alters the distance between the capacitor plates, changing the capacitance of the sensor. The touch force may be measured by controller circuitry as a change in an alternating electrical signal applied to the touch sensor. One embodiment of a capacitive force sensor appropriate for use in touch screen applications is described in U.S. Patent Application, U.S. Ser. No. 09/835,040, filed Apr. 13, 2001 and entitled "Method and Apparatus for Force-Based Touch Input," which is hereby incorporated by reference in its entirety. In this particular embodiment, the sensor measures the applied force based on the change of capacitance of a capacitive element.

A touch surface 210, or overlay, is located within a structure or housing 215. The touch surface 210 is typically transparent to allow viewing of a display or other object through the touch surface. In other applications, the touch surface 210 can be opaque.

The structure or housing 215 may be provided with a large central aperture through which the display may be viewed. If desired, the undersurface of the housing 215 may be seated directly against the surface of such a display, over the border surrounding its active area. In another embodiment, as mentioned above, the overlay may be replaced by a structure including a display unit, such as an LCD.

A capacitive sensor 220 may be positioned between the touch surface 210 and the housing 215. An interconnect 225, with attachment lands 233, may be coupled to the housing 215 by soldering, cementing, or by other methods. A conductive area forms a first conductive element 234 on the interconnect 225. A second conductive element 235 with a central protrusion 240, for example a dimple, may be attached to the lands 233 of the interconnect 225 by soldering, for example. A small gap 280 is formed between the first conductive element 234 and the second conductive element 235, either by the shape of the second conductive element 235, or by the process of attaching the second conductive element 235 to the interconnect 225. The width of the gap 280 may be approximately 1 mil, for example. A capacitor is formed by the conductive elements 234, 235 separated by the gap 280.

An optional bearing surface 270 may be interposed between the touch surface 210 and the second conductive element 235. This may protect the touch surface 210 from indentation or from damage by the protrusion 240, especially in cases where the overlay is made of softer material. The bearing surface 270 may also mount to the touch surface 210 through a thin layer (not shown) of elastomer or of highly pliable adhesive, thereby providing a lateral softening function. It will be appreciated that, in normal operation, the touch surface 210 or bearing surface 270 is in contact with the protrusion 240: these elements are shown separated only for clarity in the illustration.

The second conductive element 235 combines the functions of a spring and a capacitor plate. As a perpendicular force is applied to the touch surface 210, the second conductive element 235 flexes, decreasing the width of the gap 280 and increasing the capacitance of the sensor 220. This change in capacitance may be measured and related to the force applied to the touch surface 210. Although a touch screen using capacitive force sensors is described, other types of force sensors may be used in a similar manner, including, for example, piezoelectric sensors and strain gauge sensors.

One of the advantages of a force-based touch screen is that the number of optically distinct layers positioned between the display unit and the user is low. Typically, the overlay positioned over the display unit is a single layer of glass or relatively stiff polymer, for example polycarbonate or the like, which may be chosen for suitable optical qualities. This contrasts with other types of touch screen, such as resistive or capacitive touch screens, that require several, potentially optically lossy, layers over the display unit. The electrically conductive thin films required in resistive or capacitive touch screens typically have a high index of refraction, leading to increased reflective losses at the interface. This is a particular problem in resistive screens where there are additional solid/air interfaces and where antireflection coatings are not useful, since the conductive layers must be able to make physical contact. A screen overlay for a force-based touch screen, however, has only its upper and lower surfaces; these may be treated to reduce reflective losses and to reduce glare. For example, the overlay may be provided with matte surfaces to reduce specular reflection, and/or may be provided with antireflection coatings to reduce reflective losses.

Figure 3:
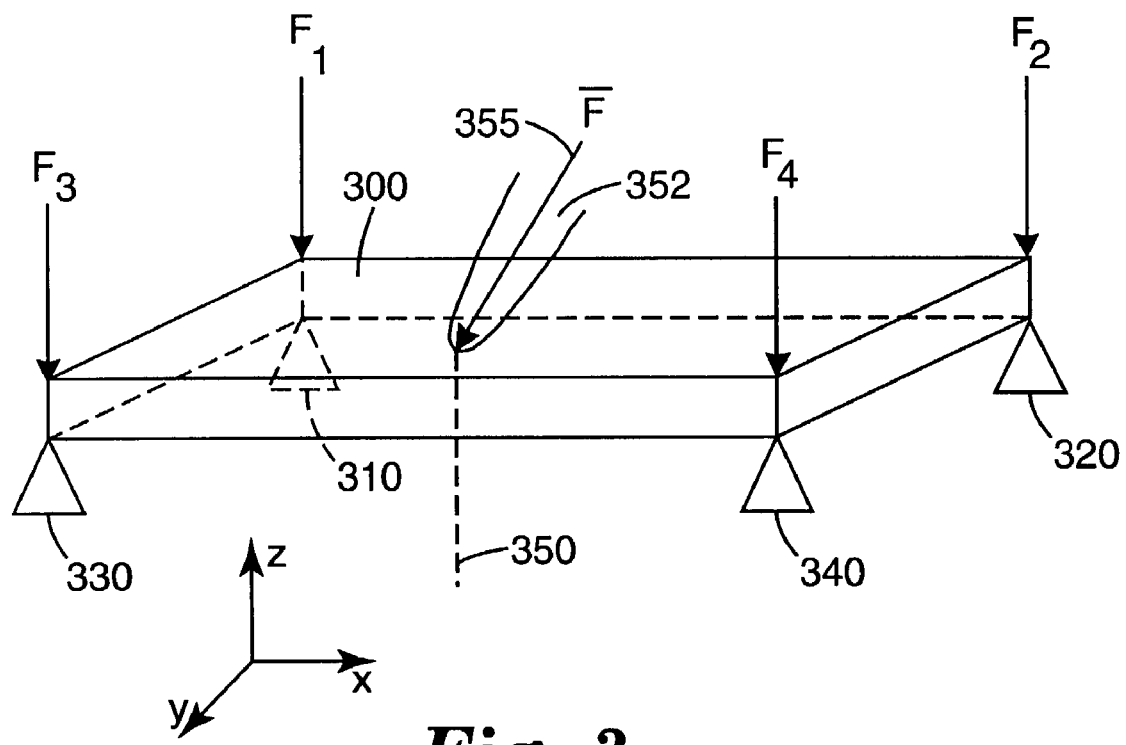
FIG. 3 schematically illustrates a perspective view of a touch screen with force sensors located at the corners of the touch screen in accordance with an embodiment of the invention.

A perspective view of a touch screen is schematically illustrated in FIG. 3. A touch surface 300 is shown disposed proximate to force sensors 310, 320, 330, 340 located at the corners of the touch surface 300. As a stylus, finger or other touching device 352 presses the touch surface 300, a touch force 355 is exerted upon the touch surface 300 at the touch location 350. The touch force 355 creates forces F1, F2, F3, and F4 on the force sensors 310, 320, 330, 340 perpendicular to the touch surface 300. The force sensors 310, 320, 330, 340 may be driven with an alternating electrical signal. The perpendicular forces F1, F2, F3, and F4 cause a change in the capacitance of the force sensors 310, 320, 330, 340, thereby causing the signal coupled through the force sensors 310, 320, 330, 340 to change. The force responsive signals derived from the force sensors 310, 320, 330, 340 may be used to calculate touch location information.

Figure 4:
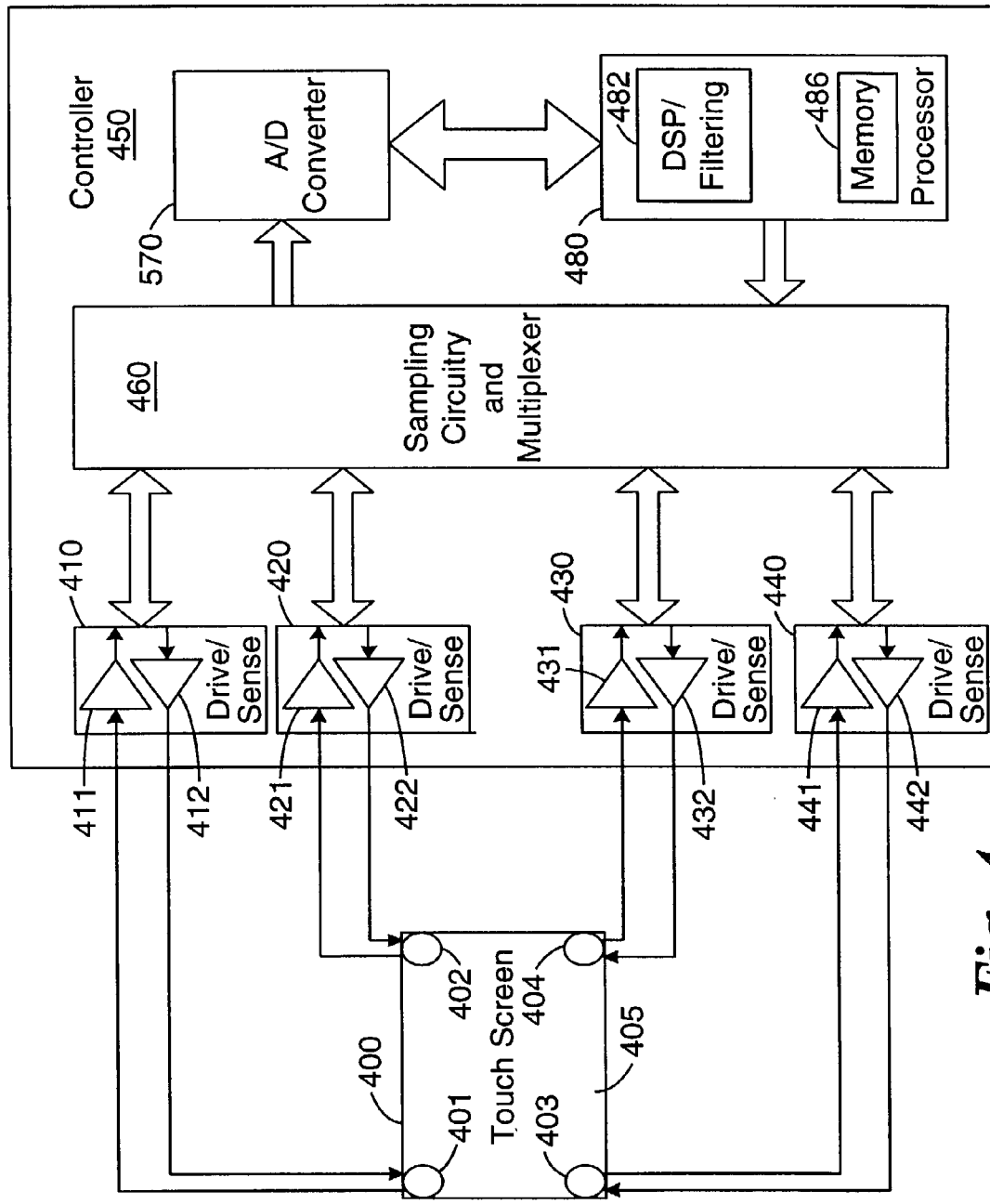
FIG. 4 is a block diagram of a touch screen and touch screen controller in accordance with an embodiment of the invention.

In the exemplary embodiment illustrated in FIG. 4, a touch surface 405 is configured proximate to four force sensors 401, 402, 403, 404 arranged at the corners of the touch surface 405. The sensors 401, 402, 403, 404 may be chosen from a variety of sensing technologies, including capacitive, piezoelectric and strain gauge sensors. The sensors 401, 402, 403, 404 measure the force of a touch detected at the sensor locations and are coupled to drive/sense circuitry 410, 420, 430, 440 located within the controller 450. Alternatively, some components of the drive/sense circuitry may be located near the corresponding sensor. An energizing signal developed in the drive circuitry for each sensor 412, 422, 432, 442 is used to energize the sensors 401, 402, 403, 404. Each sensor 401, 402, 403, 404 produces a touch force signal corresponding to a touch force applied to the sensor through the touch surface 405. The touch force signal developed by each sensor 401, 402, 403, 404 is detected by sense circuitry 411, 421, 431, 441 located within the controller 450.

Analog voltages representing the touch force at each sensor location are produced by the sense circuitry 411, 421, 431, 441. These voltages may then be sampled, and the held values multiplexed in sampling circuitry 460. The sampling circuitry 460 provides for sampling the analog force sensor signals at a rate sufficient to produce a representation of the signals sufficient for touch location determination. The sampled signals are directed to an analog to digital (A/D) converter 470 where the signals are digitized. The digitized touch signal samples are directed to processor circuitry 480 for further signal processing, such as filtering 482, and for calculations to determine a touch location. The processor circuitry 480 may be coupled to memory circuitry 486 for storage of, for example, data representing the sampled touch signal, as well as various touch screen calibration parameters. The processor circuitry 480 may perform a number of additional controller functions, including controlling the system timing, the multiplexer circuitry 460 and the A/D converter 470.

It may be found advantageous to implement the touch screen control system 450, or its equivalent, on a single mixed-mode integrated circuit chip. In such an implementation, it may be advantageous to replace sampling circuitry 460 and A/D converter 470 with a set of delta-sigma converters operating in parallel, one for each sensor channel.

Figure 5:
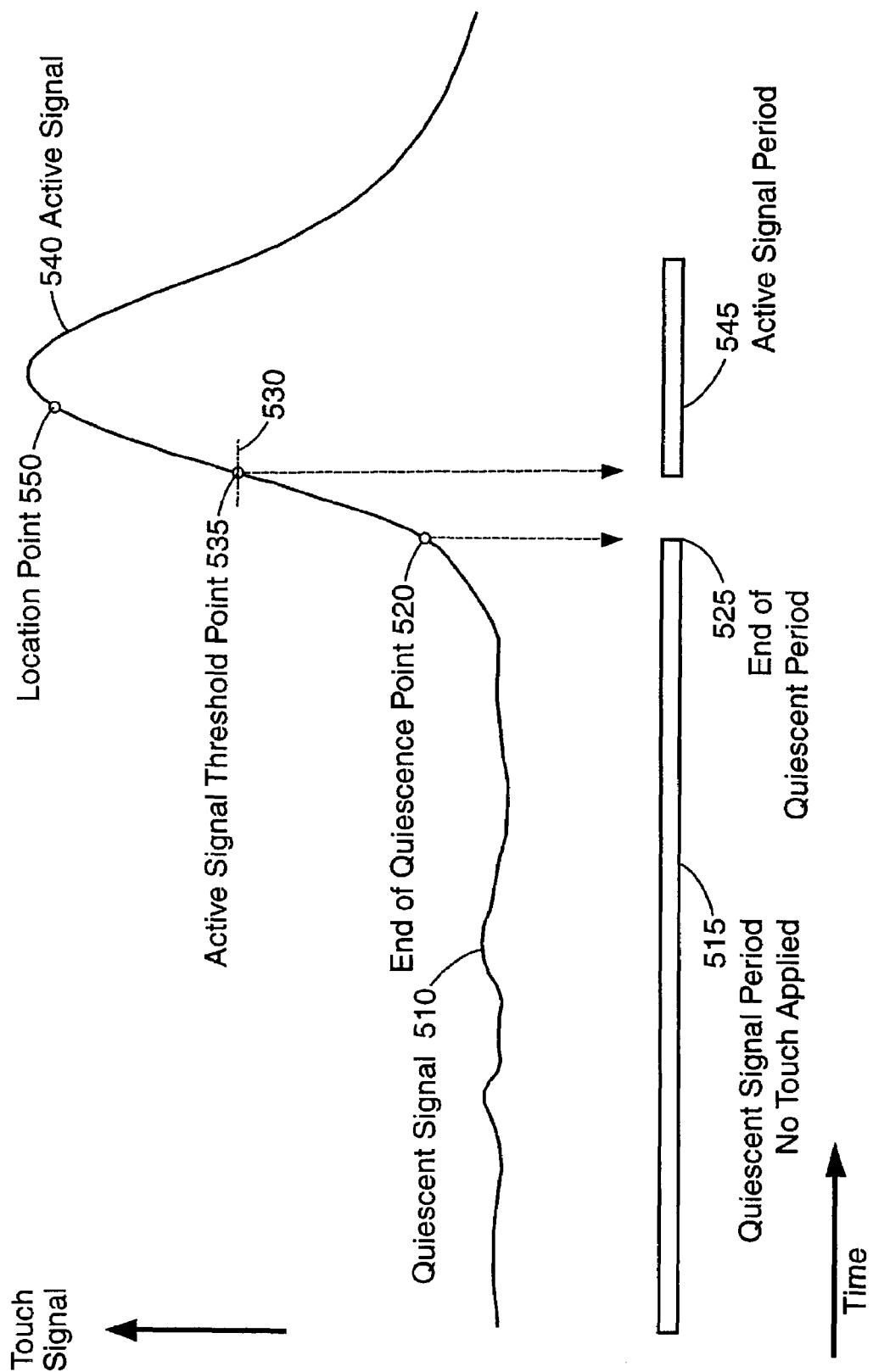
FIG. 5 illustrates a threshold point and location point in accordance with an embodiment of the invention.

One method for timing the touch location calculation is described in commonly owned U.S. patent application entitled "Method for Improving Positioned Accuracy for a Determined Touch Input," which is hereby incorporated herein by reference in its entirety. According to this method, touch location may be calculated from data gathered at a preferred time within the touch signal time profile. Accurate determination of the preferred time for touch location calculation by this method may entail two decisions: 1) a decision that a touch event has begun, and 2) a decision that a preferred time for making a touch location measurement has occurred. One example of this method is illustrated in FIG. 5. Prior to the application of a touch on the touch screen, the touch signal remains at a quiescent level 510 during the quiescent period 515. When a touch is applied, the touch signal rises in response to the force exerted on the screen. As the signal rises in response to a touch, a point in the touch signal is reached 520 ending the quiescent period 515. The transition between the quiescent period 515 and the end of the quiescence 525 may be determined by various techniques. The beginning of a touch event may be determined when the touch signal exceeds a predetermined active touch threshold 530 at active threshold point 535. The active touch signal 540 progresses through an active touch period 545 by rising above the active signal threshold 530 and then declining as the touch is removed. A location point 550 may be established at a preferred time for making a measurement to determine the touch location. The preferred time for obtaining touch location information may be based upon the shape of the touch signal.

A touch signal may represent a combination of force responsive touch sensor signals. The sensor signals are sampled at a rate sufficient to capture an adequate representation of the signals for the purpose of determining a touch presence and location. For example, the sensor signals may be sampled at a rate of 183 Hz, although other sampling rates may be used. The signals are digitized by an analog to digital (A/D) converter and various digital signal processing steps may be performed, including scaling, filtering, and signal correction according to previously determined calibration factors. One or more reference levels representing a zero touch force condition may be acquired from touch signal samples taken during a quiescent period when the touch screen is not loaded by a touch force. The reference levels used to calculate the touch location depend on the type of touch signal detected.

A reference level in the present context represents the current best estimate of the correct zero-force reference level for the touch signal data stream. A reference level that compensates for low frequency noise and long term drift reflects the quiescent touch signal over a relatively long period of time. Such a reference level, denoted herein as a baseline reference, may be acquired, for example, by performing a real-time, moving, weighted average of the quiescent touch signal samples.

Another technique for acquiring the baseline reference is by adjusting the baseline reference in the direction of the touch signal sample value as each sample is taken so long as the sample value is close to the level of the current baseline. When the sample value is close to the value of the current baseline reference, such as within plus or minus a margin having a value equal to 20% of the active-touch threshold, the current baseline reference may be changed by a fixed but small increment. The small increment of change is chosen as a value that tracks the effects of drift on the quiescent signal but prevents large changes in the baseline caused by brief signal fluctuations. For instance, the increment may be chosen such that when applied uniformly in the same direction at every sample time, the result is to slew the baseline at 2% of the active-touch threshold per second. When the sample values are not close to the current baseline estimates, the current baseline level remains unchanged.

A tentative baseline may also be formed from the ongoing data. If the sample values stay sufficiently close to the tentative baseline for a period of time, the tentative baseline may be substituted as the current baseline level. The procedure of using a tentative baseline to replace a current baseline may be necessary to provide an escape from a condition where erroneous baseline values may cause false touch detection. Some normal occurrences, such as changing the tilt angle of a touch screen, can cause a large step change in the zero-touch force signal. The technique of acquiring a tentative baseline that can be substituted for the current baseline within an appropriate interval of time limits the effect of an erroneous baseline level. Further, any touch force, even when carefully sustained, shows considerable fluctuation in force level. Thus, the appearance of steady zero-touch force values far from the presumed current baseline indicates that the force values are in error and the current baseline should be replaced with a correct baseline.

Figure 6:
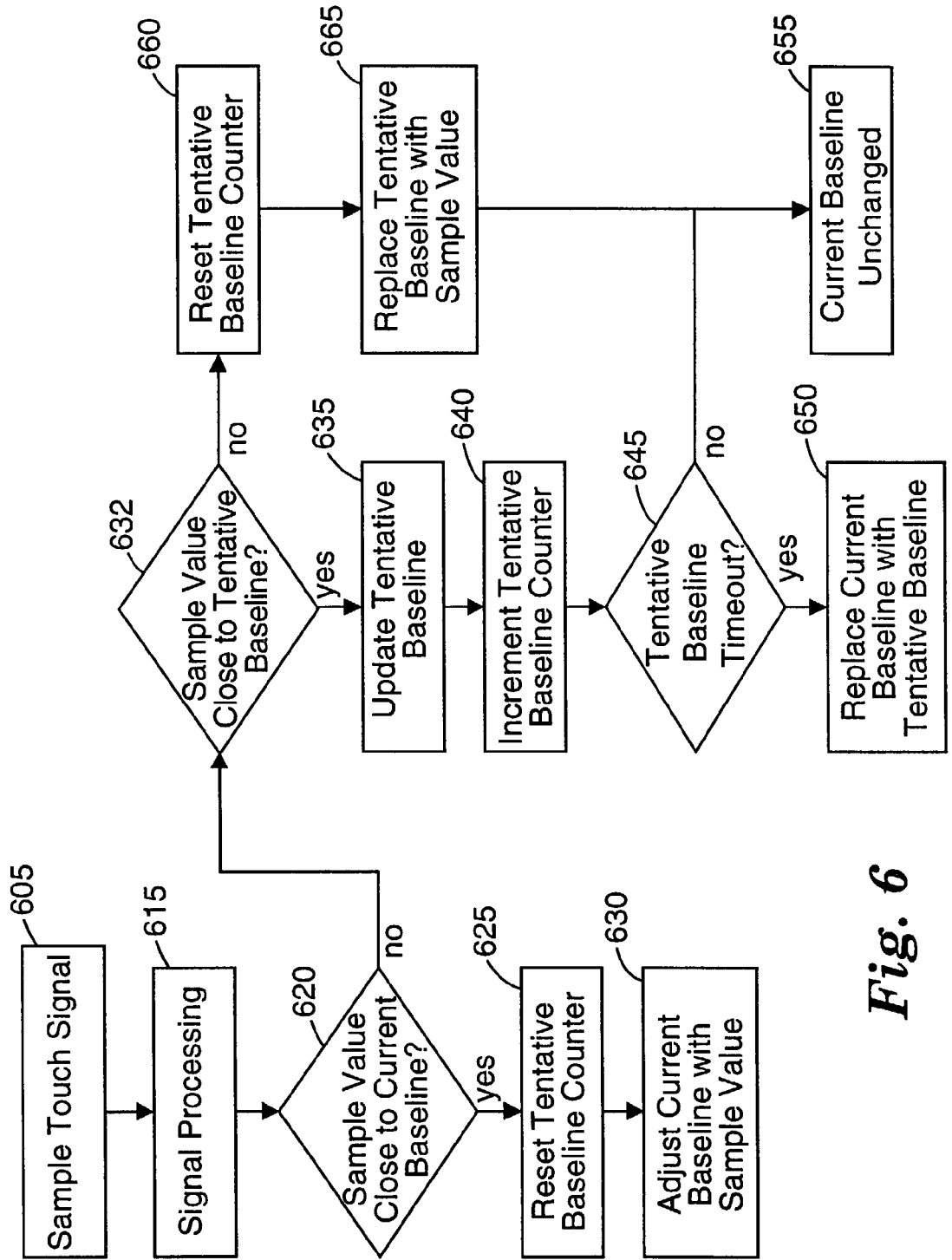
FIG. 6 is a flowchart illustrating a method of acquiring a baseline reference value in accordance with an embodiment of the invention.

FIG. 6 is a flowchart illustrating a technique of acquiring a current baseline level in accordance with an embodiment of the invention. The next available set of digitized sample values are acquired 605. Various signal processing steps may be applied to the digitized touch signal including scaling, decimation, filtering and calibration adjustment 615. If the absolute value of the difference between the sample value and the current baseline is less than a predetermined value 620, e.g. 20% of the active-touch threshold, the tentative baseline counter is reset 625 and the current baseline is adjusted with the sample value 630. If the sample value is not close to the current baseline 620, but is close to the tentative baseline 632, then the tentative baseline is updated with the sample value 635 and the tentative baseline counter is incremented 640. If the tentative baseline counter reaches its timeout value 645, then the current baseline is replaced with the tentative baseline 650. If the tentative baseline counter has not reached its timeout value, the current baseline remains unchanged 655.

Calculation of the touch location may be performed, for example, using combinations of the force responsive touch sensor signals. The force responsive signals generated by the touch sensors may be used to calculate various touch signals, including the moment about the y-axis, $M_y$, moment about the x-axis, $M_x$, and the total z-direction force, $F_{Tz}$. The coordinates of the touch location are determined from the force sensor signals as in Equation 1, assuming a reference point in the center of the touch screen, ideal conditions, with no errors, background fluctuations or disturbances present other than the touch force.

$$X = \frac{M_y}{F_{Tz}} \quad [1]$$

$$Y = \frac{M_x}{F_{Tz}}$$

where
$M_y = (F2+F4)-(F1+F3)-M_{y\_baseline}$;
$M_x = (F1+F2)-(F3+F4)-M_{x\_baseline}$; and
$F_{Tz} = F1+F2+F3+F4-F_{Tz\_baseline}$ According to Equation 1, $M_y$, $M_x$, and $F^{Tz}$ represent the differential values between the corresponding touch signals and their associated baseline reference values.

In addition to acquiring and updating a current baseline value representing the long term zero touch force reference level, a faster fluctuating background reference level may also be acquired. The background level compensates for short term effects on the touch screen, such as an operator squeezing or twisting the device during a touch. Such a background reference may represent the touch signal state at a moment in time just prior to the application of touch force.

The background reference responsive to short term effects on the touch screen may be established using one or more touch signal values acquired contemporaneously with the detection of the touch force. The one or more touch signal values used to establish the reference are touch signal values acquired within an interval close in time to the detection of the touch force. In one example, the touch signal values used to establish the reference are acquired within 100 ms of the detection of the touch force. Touch location may then be computed from the differential value formed by subtracting the background reference from the touch signal at the location point.

The baseline reference may be subtracted from both the background reference and the touch signal at the location point. The differential value between the touch signal at the location point and the background reference is the same, regardless of whether or not a slow baseline value has previously been subtracted from both the background reference and the touch signal. Thus in an alternative embodiment of the invention, a background reference may be formed and subtracted in the touch location computation without first subtracting the baseline reference. In this situation, the background reference compensates for all speeds of fluctuation in the zero touch force reference level. Such a simplified approach may be particularly suitable in button type applications that do not require continuing response to a continuing touch.

In one embodiment of the invention, both a baseline reference level and a background reference level are acquired in accordance with one of the methods set forth above. Two touch locations are calculated after a touch presence is detected. The coordinates of the touch down location are calculated as set forth in Equation 1 above. This calculation produces touch location data referenced to the baseline reference value only. A second touch location may be calculated that corrects the values produced by Equation 1 for background fluctuations. The coordinates of the second touch location may be calculated as in Equation 2.

$$X_{\_bc} = \frac{M_y - M_{y\_bc}}{F_{Tz} - F_{Tz\_bc}} \quad [2]$$

-continued $$Y_{\_bc} = \frac{M_x - M_{x\_bc}}{F_{Tz} - F_{Tz\_bc}}$$

where $M_y$, $M_x$, and $F_{Tz}$ represent the corresponding touch signals with their associated baseline reference values subtracted, and $M_{y\_bc}$, $M_{x\_bc}$, and $F_{Tz\_bc}$ represent the background reference values associated with the $M_y$, $M_x$, and $F_{Tz}$ touch signals, respectively.

A system employing both a baseline reference and background reference may provide greater accuracy during continuing touches used for drag-and-drop operations, and better detection of very slowly applied touches. Further the use of both a baseline reference and a background reference may be particularly advantageous when a very slowly applied touch is also a continuing touch.

The touch signal, $F(t_n)$, may be taken to represent a set of scalar values describing the touch signal state at time $t_n$. This set may, for instance, comprise the raw readings from the sensors, or may comprise a sufficient set of linear combinations of these, such as total force and moments about the X and Y axes. The set may also comprise filtered signal values, and may reflect the subtraction of a slow baseline, if used. Many different combinations are possible within the scope of the present invention. For concreteness and simplicity in the discussion below, however, a complete touch signal sample value may be taken to comprise the combination of total force with X-axis and Y-axis moments, with the terms "touch signal level" and "touch signal magnitude" taken to denote the total force component alone.

According to one method of the present invention, the background reference level corresponds to a delayed sample of the touch signal. For example, if the current touch signal sample, $F(t_n)$, corresponds to the touch signal at time $t_n$, the background reference may be chosen to correspond to a touch signal sample $F(t_{n-m})$ taken at time $t_{n-m}$, m samples earlier than the current touch signal. In an alternate method, the background reference level may correspond to a low-pass filtering of the current touch signal $F(t_n)$; or, to the value of a low pass filtering of the touch signal m samples prior to the current touch signal sample.

In one embodiment, the background reference may be taken with respect to the time of the location point. For instance, the location point may be established by determining the presence of a peak in the signal level at time $t_n$, and then the location may be computed from the components of the touch signal at the location point, represented by $F(t_n)$, less the components of the touch signal at time $t_{n-m}$, represented by $F(t_{n-m})$. In this simple procedure, the value of m must be large enough to allow for the full evolution of the touch profile to its location point. For instance, at a sampling rate of 200 Hz, m may be set to a value between 10 and 20 to provide a 50 to 100 ms delay.

With m large, however, the delay will often be larger than necessary, thus allowing the true zero touch force level to fluctuate more than necessary between $t_{n-m}$ and $t_n$. On the other hand, smaller values of m may occasionally incorporate some of the touch itself into the background reference. Incorporation of some of the touch signal rise into the background reference may not generally affect the location computed for the initial touch location at the time when the touch is first applied to the touch screen, denoted the touch down point.

Allowing incorporation of the touch signal rise into the background reference may create problems with continuing touches used for a moving touch. Any time a background reference reflects some of the touch force applied to one location, but is used to compute a touch location when the touch has moved elsewhere, there is potential for error. This problem may also affect a rapid sequence of touches, unless the method of acquiring the background is adapted to require that the signal level return to a quiescent level, such that the background reference is not affected by the trailing edge of a preceding touch.

In another embodiment, the difficulties associated with contamination of a background reference with a touch signal rise may be minimized by acquiring the background reference with respect to a trigger event early in the touch profile. For example, the background reference may be established at a time when the touch signal has risen rapidly or to a magnitude signaling the end of the quiescent period. The triggering event signaling loss-of-quiescence may comprise the earlier of either: (i) a fast rise trigger, marked by a rise rate of the signal exceeding a predetermined minimum rate, such as 1% of the active-touch threshold per millisecond, or (ii) a slow rise trigger, marked by the signal level rising beyond a loss-of-quiescence threshold represented by a predetermined value above the slow baseline, such as 20% of the active-touch threshold. Since such a loss-of-quiescence threshold may be chosen to be well below an active-touch threshold, a loss-of-quiescence event will always occur before a location point is achieved.

A background reference acquired at the triggering loss-of-quiescence event may be held unchanged while used in subsequent touch location calculations, and continue to be held until the touch is removed and the quiescent condition reestablished. If loss of quiescence is recognized at time $t_n$, then the background reference may be $F(t_{n-m})$. Due to the close proximity to the beginning of the touch force profile, this may now correspond to a delay of, for instance, 20 mS, with m set to 4 at a sampling rate of 200 Hz. The delay between the loss-of-quiescence event and the background reference is reduced in comparison with the situation in which the background reference is taken with respect to the touch location point, as previously discussed.

Figure 7:
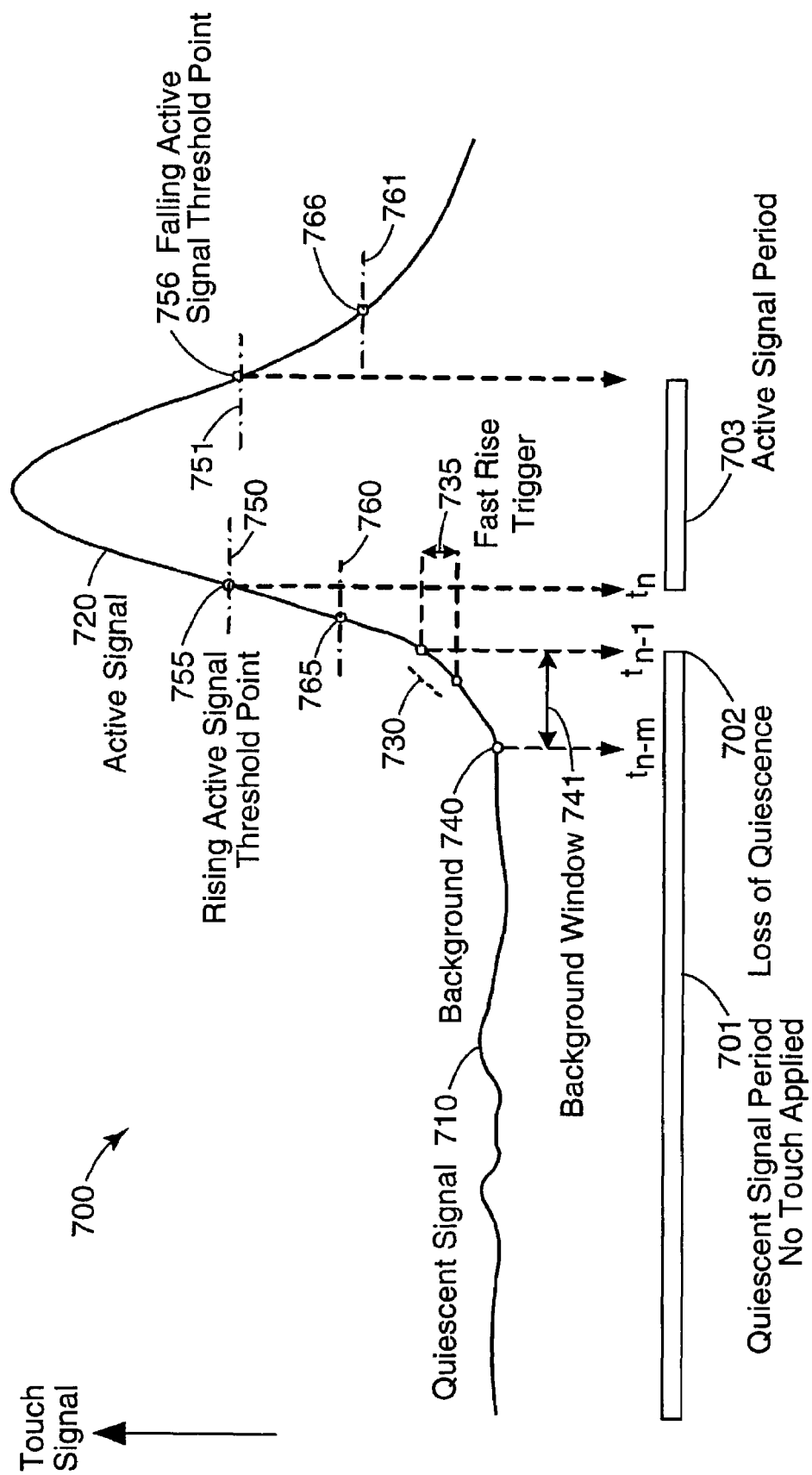
FIG. 7 illustrates a fast rise trigger for detecting loss-of-quiescence in accordance with an embodiment of the invention.
Figure 8:
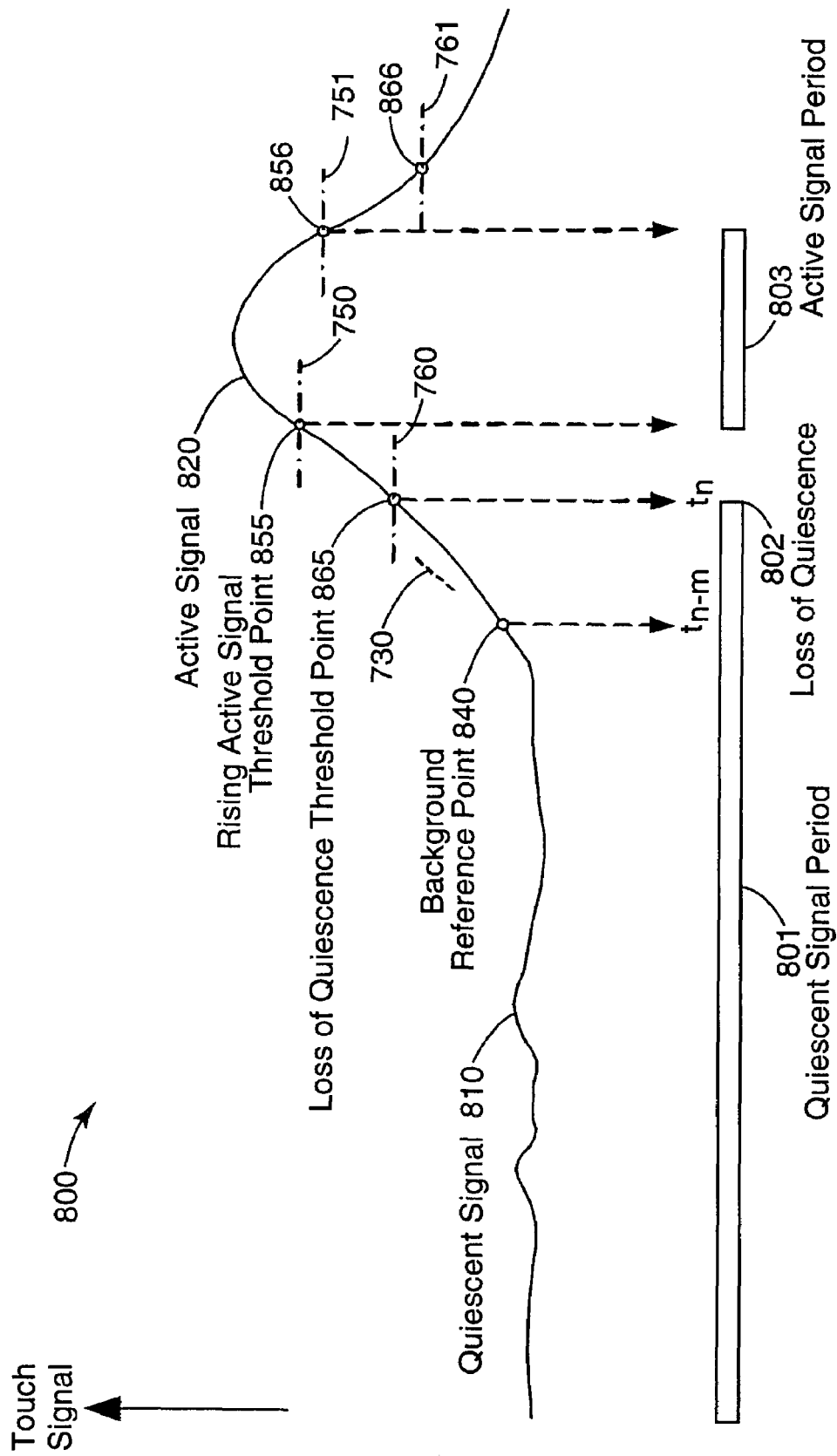
FIG. 8 illustrates a slow rise trigger for detecting loss-of-quiescence in accordance with an embodiment of the invention.

FIGS. 7 and 8 show the transition between a quiescent signal period and an active signal period marked by a loss of quiescence event determined by a fast rise trigger and a slow rise trigger, respectively. In FIG. 7, a fast rise trigger event is illustrated. The touch signal transitions rapidly from a quiescent signal 710 to an active signal 720. A loss of quiescence 702 marks the transition from the quiescent period 701 representing a period of zero touch force to a state which may or may not develop into an active signal period 703 representing a period in which a touch has been determined to have been applied to the touch screen. As depicted here, a typical touch of adequate magnitude has been applied to the touch screen, and a full sequence of processing events is depicted in response. Loss of quiescence 702 is determined the first time that the touch signal slope exceeds a predetermined value 730. The signal slope is determined by subtracting the signal magnitude at sample time $t_{n-1}$ from the signal magnitude at the current sample time $t_n$. If this difference exceeds a value 735, corresponding to slope 730 over the interval represented by the difference, then a fast-rise event has occurred, ending the quiescent period. When the quiescent period ends, the nature of the trigger event, which is a fast rise trigger, may be recorded for use in later processing.

A working set of background reference values may be continually updated from a delayed value of the touch signal, $F(t_{n-m})$, during the quiescent period 701. Equivalently, the background reference may be taken just at the end of the quiescent period 702 at $t_n$. In either case, the background reference is left unchanged after the loss of quiescence 702. The fast-rise trigger 735 ends the quiescent period 701 in the illustrated case, since it occurs prior to the signal level exceeding a loss-of-quiescence threshold 760 at point 765.

Once the signal level rises above active-touch threshold 750 at active-touch threshold point 755, a location point may be sought, and an initial touch location, denoted a touch down location, may be reported. Prior to the signal level dropping below a falling-touch threshold 751 at point 756, additional location points may be reported, depending in part upon the duration of the touch. After the signal level drops below the falling touch threshold 751, a final touch location, denoted the touch up location, may report the last position of touch prior to the loss of the active-touch condition. The falling touch threshold 751 may be set equal to active touch threshold 750. Alternatively, the falling touch threshold 751 may be set to a somewhat smaller value, such as 72% of active touch threshold 750, to minimize unexpected dropouts during what the user intends to be continuing touches.

After the signal level falls below an allowed quiescence threshold 761 at point 766, which may have the same value as loss-of-quiescence threshold 760, additional appropriate conditions may again indicate a quiescent period. A minimal additional condition may comprise detection of at least one signal value below that of the immediately preceding sample, to establish that the quiescence condition is not erroneously being reasserted in the interval just after the fast-rise trigger clears it.

FIG. 8 illustrates a slow rise trigger. The processing method and parameters are unchanged from the example of FIG. 7, but in this situation, the touch signal rises relatively slowly from a quiescent touch signal 810 to an active signal 820. A loss of quiescence 802 marks the transition from the quiescent period 801 representing a period of zero touch force to an active signal period 803 representing a period in which a touch is applied to the touch screen. Loss of quiescence 802 is determined the first time that the touch signal exceeds a predetermined value 760 at a point 865. The touch signal passes through the loss-of-quiescence threshold 760 at time $t_n$ without slope threshold 730 being first exceeded. A slow-rise event occurs when the touch signal exceeds the loss-of-quiescence threshold 760, ending a quiescent period. When the quiescent period ends, the nature of the trigger event, which is a slow rise trigger, may be recorded for use in later processing. In other respects, the touch is processed as in FIG. 7.

Once the signal level rises above active-touch threshold 750 at active-touch threshold point 855, a location point may be sought, and a touch down location, may be reported. Prior to the signal level dropping below a falling-touch threshold 751 at point 856, additional location points may be reported. After the signal level drops below the falling touch threshold 751, the touch up location may be reported as the last position of touch prior to the loss of the active-touch condition. The falling touch threshold 751 may be set equal to active touch threshold 750. Alternatively, the falling touch threshold 751 may be set to a somewhat smaller value as previously described. After the signal level falls below a quiescence threshold 761 at point 866, which may have the same value as loss-of-quiescence threshold 760, the touch signal may again enter a quiescent period if additional conditions are met indicating quiescence, as previously discussed in connection with FIG. 7.

A number of variations on the embodiment just described may be considered. In one variation, the conditions for determining a return to a quiescent period may further include the requirement that a number of successive preceding sample values, such as three, span a narrow magnitude range, such as 5% of the active-touch threshold value. This is particularly applicable to rapidly applied touches with force profiles that nearly or partly overlap. It may preserve background values reflective of a true zero-force level present at some earlier time, preventing them from being updated with a later set contaminated with force of a touch that has not yet fully disappeared from the signal.

In another variation, developing and subtracting the baseline reference may be omitted. A signal level to be employed in threshold comparisons may then be taken as the difference between the current touch signal level, and the touch signal level reflected in a set of background values that is continuously updated as long as the quiescence state is set. In this situation, the baseline reference is not subtracted from either the current touch signal or the background reference. Such a variation may be best adapted to applications where a continuing touch response is not required, nor a response to very slowly applied touches.

In another variation, improved accuracy may be achieved by extrapolating a background reference at the time of the location point. Suppose that methods as discussed previously have been used to acquire a first set of background reference values, and that these represent a measured quiescent point at time $t_{o-p}$ some p sample times prior to a location point at time $t_o$. An additional delay may also be provided, such that a second set of background values may be acquired with the second set representing a measured quiescent point at time $t_{o-p-q}$ some p+q sample times prior to the location point. A set of background change rates may now be computed by dividing the differences of the values for $t_{o-p}$ minus the values for $t_{o-p-q}$ by q. An extrapolated set of background reference values for the location point may now be formed by adding the background change rates multiplied by p to the first set of background reference values, corresponding to sample time $t_{o-p}$. Locations computed in this manner may be most accurate for applications in which the fluctuation in zero-touch-force signals is dominated by medium speed events, which do not alter their rate of change greatly in the time it takes a touch to develop.

In another variation, improved accuracy may be achieved by interpolating background values to the time $t_o$ of the location point. Suppose that the methods discussed previously have been used to acquire a first set of background values, corresponding to time $t_{o-p}$, and that a second set is acquired after removal of the touch, corresponding to time $t_{o+r}$, the first instant in which quiescence may be deemed to have returned. A set of background change rates may now be computed by dividing the differences of the touch signal values for $t_{o+r}$ minus the touch signal values for $t_{o-p}$ by the time period p+r. An interpolated set of background reference values for the location point may now be formed from the first set of background reference values, corresponding to $t_{o-p}$, by adding the background change rates multiplied by p. Touch signal values from the location point may be stored, and the reporting of touch location delayed until the interpolated background may be computed. Locations computed in this manner may be most appropriate for applications in which the predominant touch type is a tap touch, and in which background correction must be as accurate as possible.

The methods of the present invention involving extrapolating or interpolating reference values to a time the touch location information is obtained are applicable to force-based touch screens. In addition, the methods of extrapolating or interpolating reference values have broader applicability outside of force-based techniques in connection with a number of methods other used for touch sensing systems. For example, extrapolating or interpolating a reference level to the time touch location information is obtained may be advantageously employed to increase touch location accuracy in touch sensing systems using capacitive, resistive, acoustic or infrared techniques.

According to a method of the invention, in broad and general terms, a touch location on a touch screen is calculated using one or more particular reference levels representing the zero touch force level for a touch signal. Each reference level compensates for a particular condition affecting the touch signal. The particular reference levels used may be selected to compensate for various touch signal conditions detected or expected at a time a touch location measurement is made. The selection of reference levels based upon touch signal conditions results in improved accuracy in the determination of touch location.

Figure 9A:
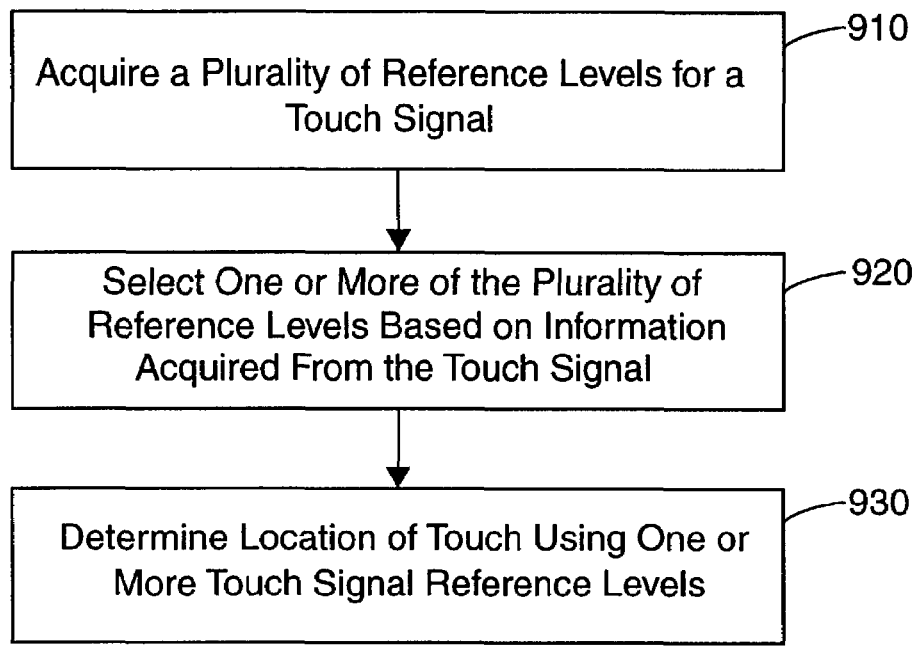
FIGS. 9A-9C are conceptual flowcharts illustrating various methods of touch location processing in accordance with the invention.

FIG. 9A is a flowchart conceptually illustrating a method of touch location processing in accordance with the present invention. A number of reference levels for a touch signal are acquired 910 from the quiescent signal. One or more of the reference levels are selected as the touch signal reference level based on information acquired from the touch signal 920. The touch location is determined using one or more of the touch signal reference levels 930.

Figure 9B:
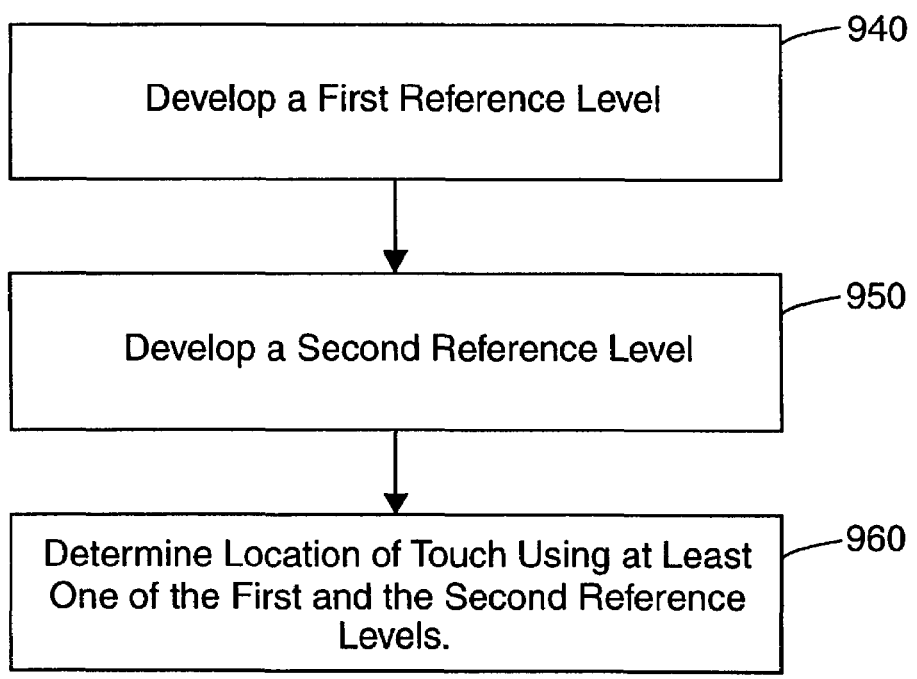

Another method of the invention is conceptually illustrated in FIG. 9B. A first reference level and a second reference level are developed 940, 950. The touch location is determined using one or both of the first and the second reference levels 960.

Figure 9C:
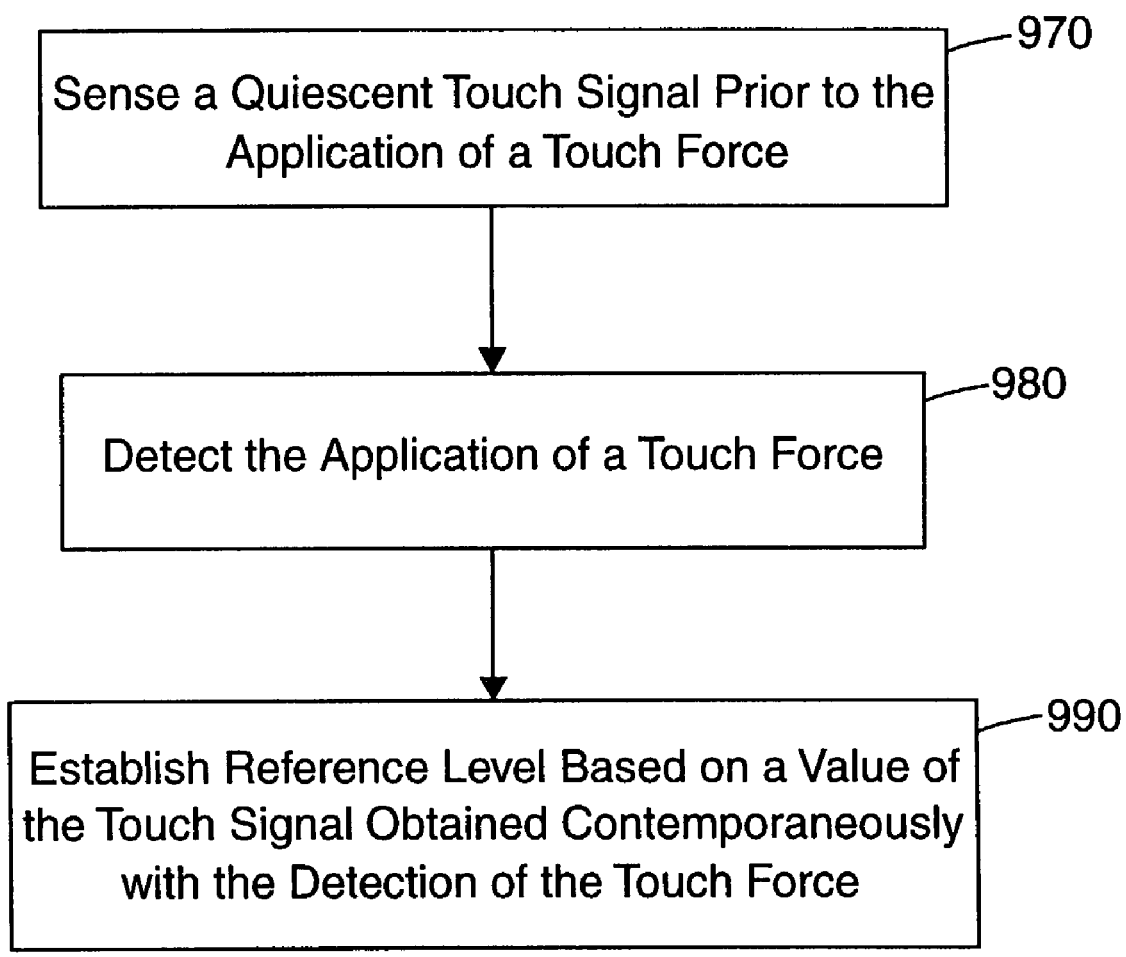

A method of establishing a background reference level is illustrated in the flowchart of FIG. 9C. A quiescent touch signal is sensed prior to the application of a touch force 970. The application of a touch force is detected 980. A background reference level is established based on a value of the touch signal acquired contemporaneously with the detection of the application of the touch force 990.

The selection of the reference level used to determine touch location is based upon the type of the touch signal. In the case of single-point touches, either quick tap touches or more deliberate slow touches, use of the background reference produces accurate results. The background reference compensates for short term effects that are present for the duration of a brief touch. However, in the case of a continuing touch signal, calculations using the background level as the reference may produce less accurate results.

A continuing touch generally occurs over a longer time period than the short term effects compensated for by the background level. Thus, the background level may become an increasingly inaccurate reference value over time. In addition, in the case of a slow touch, initiated by a slow rise trigger, the background level may be contaminated with some fraction of the active touch signal produced by the force of the touch. To mitigate these inaccuracies, the touch location calculation may be processed so that the touch location fades smoothly from a touch location calculated using the background level as the signal reference, to the touch location calculated using only the baseline reference as the signal reference. Thus a weight W may be assigned to the background-corrected location, and a location to be output computed as:

$$X\_out = WX\_bc + (1-W)X$$

$$Y\_out = WY\_bc + (1-W)Y \qquad [3]$$

The fading may be based upon the distance by which the current streaming touch point is separated on the screen from the touch down point. In this situation, W may be associated with a distance traveled by the streaming touch. The effect of the background level may be completely removed once the movement of the touch has reached a predetermined amount, for example 20% of the touch screen width. Values of X and Y retained from the touch down point may be denoted $X_{td}$ and $Y_{td}$. For convenience, the movement distance D may be taken to be the greater of the absolute values of $X-X_{td}$ and $Y-Y_{td}$. Then if S is the screen size, we may set:

$$W = \text{Max}\left[1 - \frac{D}{0.2S}, 0\right] \qquad [4]$$

According to another embodiment, all streaming touches may be processed so that the background level is gradually removed from the touch location calculation based upon the passage of time. Thus, W may decline from 1 to zero linearly over a period of, for instance, one second.

Inaccuracies in the touch location calculation for streaming touches are primarily associated with touch signals exhibiting a slow rise. The inaccuracy occurs because the slow touch may be contaminated with some portion of the active touch signal. Nevertheless, touch location accuracy may be increased by processing all streaming touches in the above manner, regardless of whether the loss-of-quiescence event was triggered by a slow rise.

Figure 10:
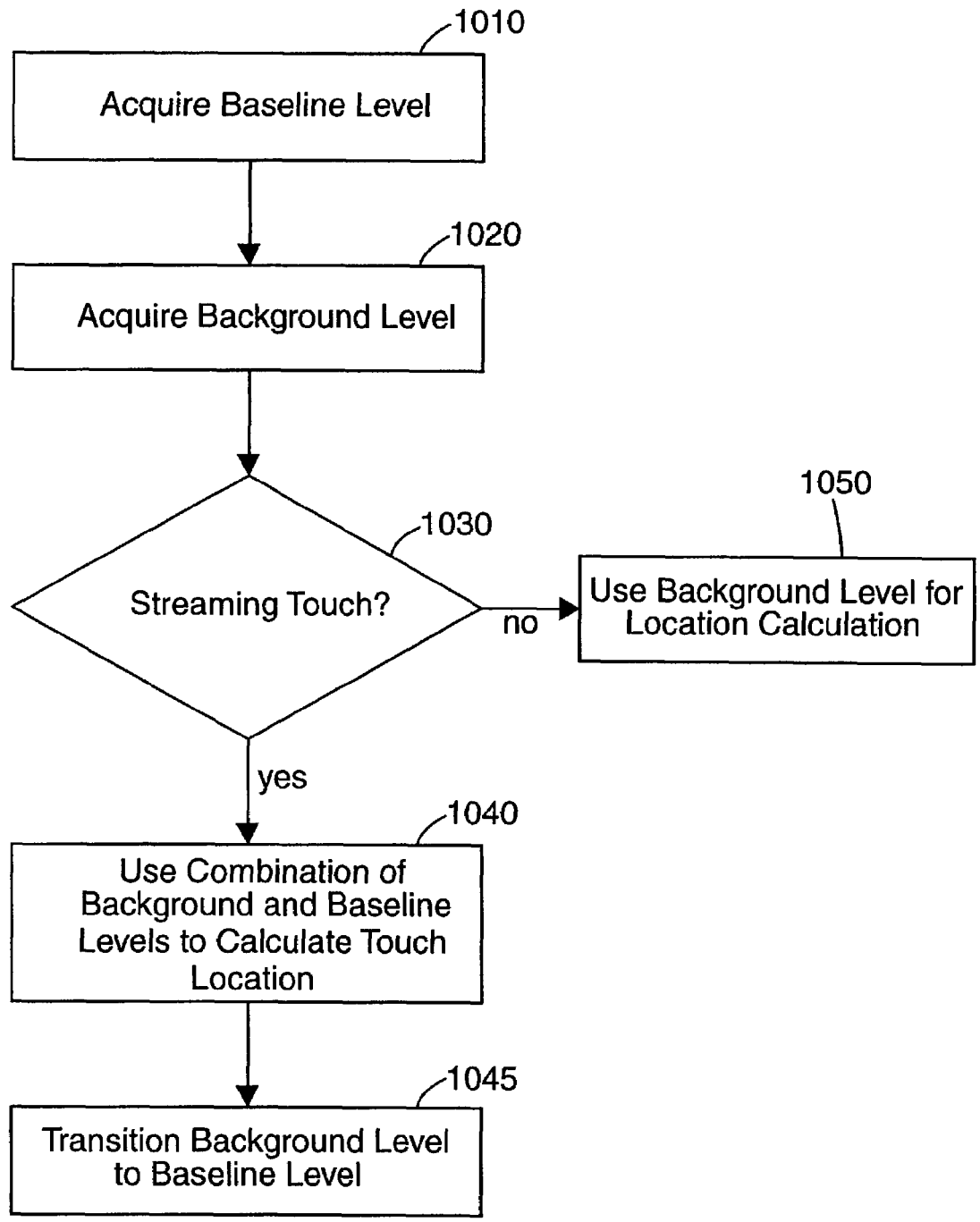
FIG. 10 is a flowchart illustrating a method of determining touch location for a streaming touch using a baseline reference value and a background reference value in accordance with an embodiment of the invention.

A flowchart illustrating a method for calculating touch location according to the principles of the invention is illustrated in FIG. 10. A baseline level 1010 and a background level 1020 are acquired by the methods discussed above. The touch location is calculated using the baseline level as in Equation 1. The touch location is calculated using the background level as in Equation 2. If the touch is not a streaming touch 1030, the touch location is calculated using the background reference level 1050. If the touch is a streaming touch 1030 the touch location is initially calculated using the background reference level. Use of the background reference is transitioned to the baseline reference level by one of the previously discussed methods 1045.

Figure 11:
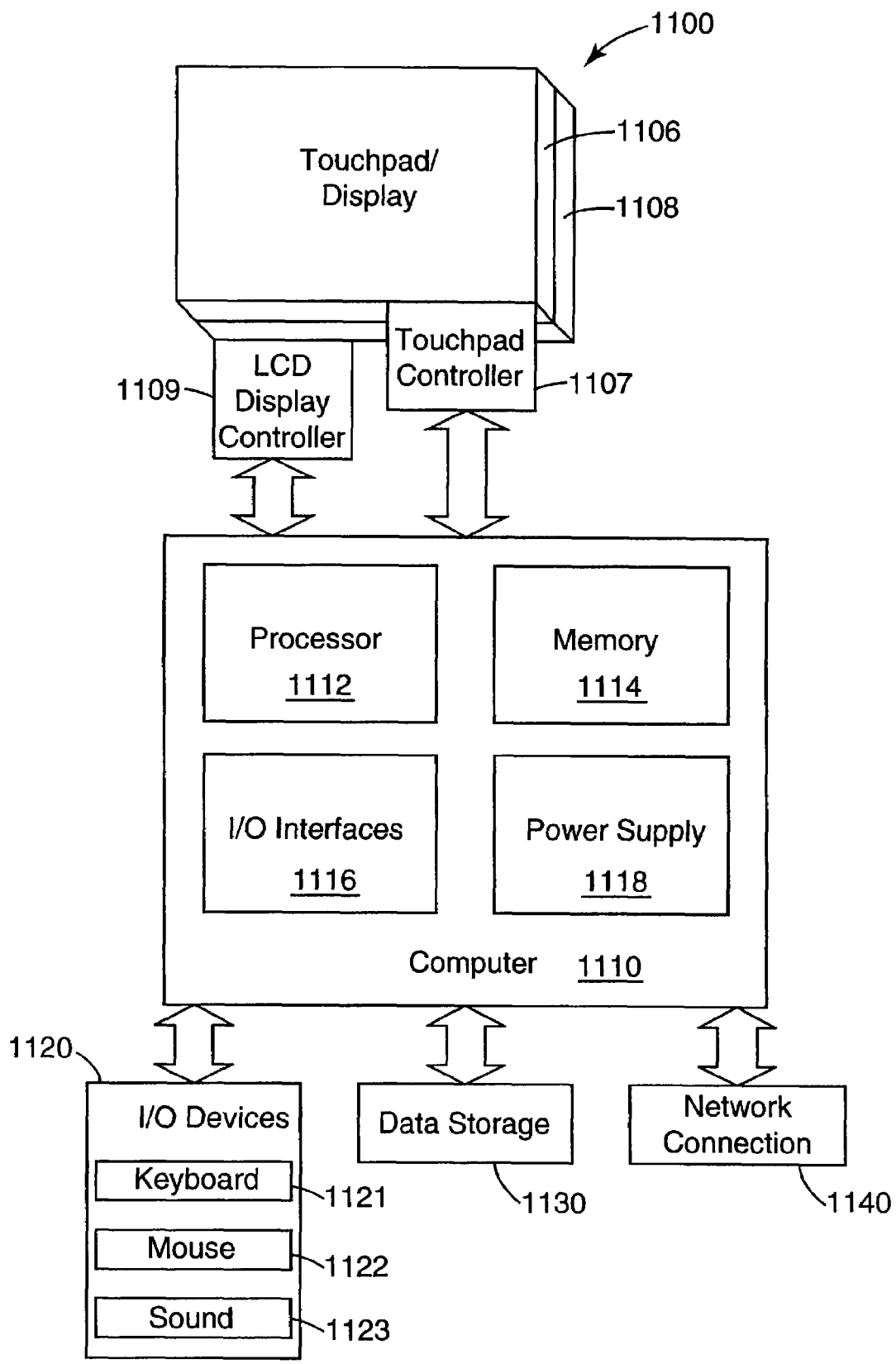
FIG. 11 is a block diagram of a data processing system using a touch sensing interface in accordance with an embodiment of the invention.

A touch screen of the present invention may be advantageously implemented in various data processing systems. Turning now to FIG. 11, a block diagram of a data processing system 1100 using an integrated touch screen and display is shown in accordance with an embodiment of the present invention. The system 1100 uses a transparent touch screen 1106 arranged above a display 1108 suitable for data processing applications, such as an LCD display. Other displays may be used, such as a cathode ray tube (CRT) display, plasma display, light emitting diode (LED) display, organic electroluminescent display, or the like. The display 1108 may require display controller circuitry 1109 for interfacing the display with the data processor computer 1110. A touch screen controller 1107 includes the drive/sense circuitry described above in addition to a touch screen controller processor according to an embodiment of the present invention.

The data processor 1110 may include various components depending upon the computer system application. For example, the data processor may include a microprocessor 1112, various types of memory circuitry 1114, a power supply 1118 and one or more input/output interfaces 1116. The input/output interfaces 1116 allow the data processing system to connect to any number of peripheral I/O devices 1120 such as keyboards 1121, pointing devices 1122, and sound devices 1123, including microphone and speakers. The data processing system may additionally include a mass data storage device 1130, for example, a hard disk drive or CD ROM, and may be networked to other data processing systems through a physical or wireless network connection 1140.

Figure 12:
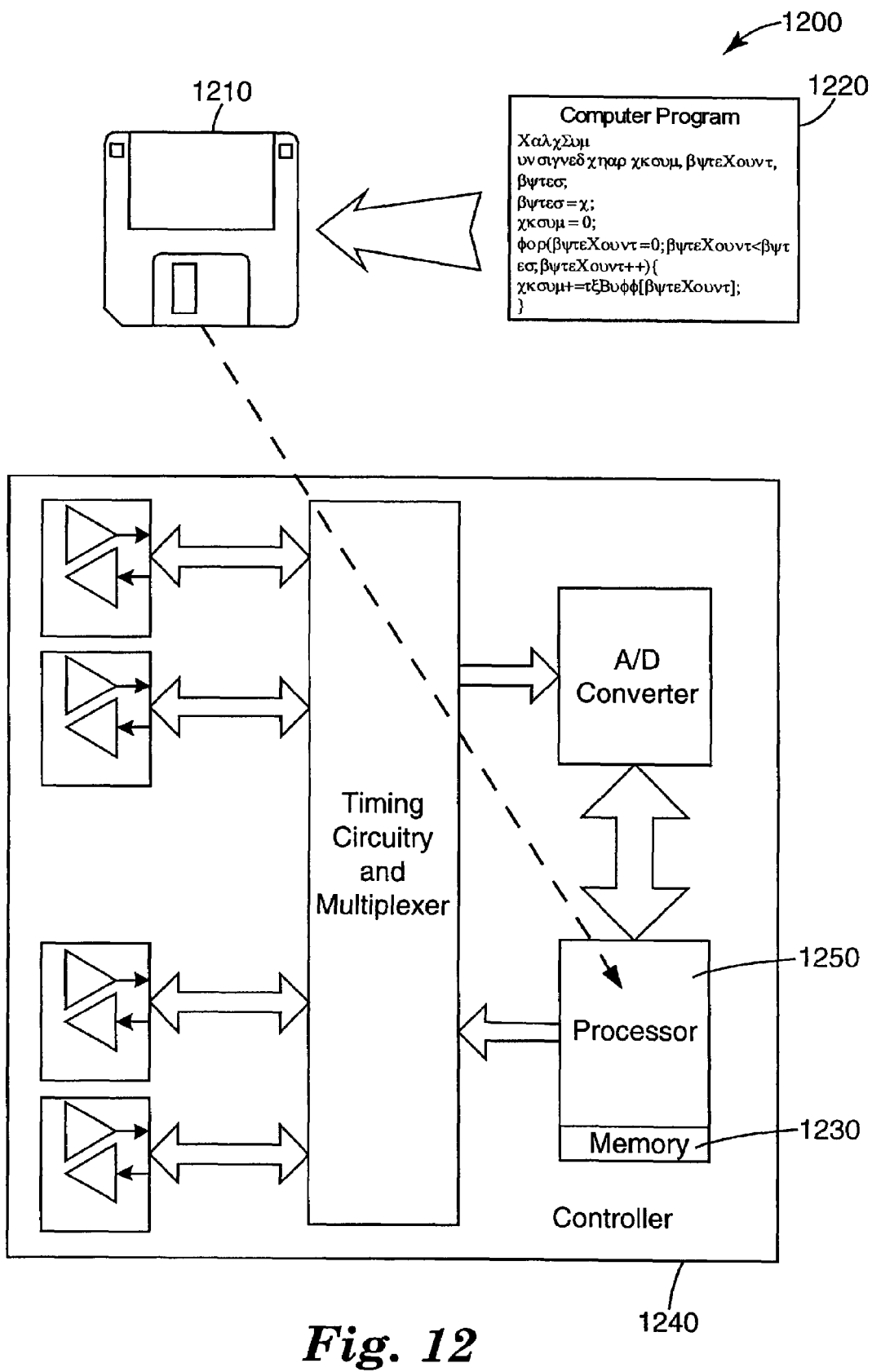
FIG. 12 illustrates a touch screen controller in accordance with an embodiment of the invention.

FIG. 12 illustrates a touch screen system 1200 in accordance with the present invention, wherein the processes illustrated with reference to FIGS. 1-10 may be tangibly embodied in a computer-readable medium or carrier, e.g. one or more of the fixed and/or removable data storage devices 1210 illustrated in FIG. 12, or other data storage or data communications devices. One or more computer programs 1220 expressing the processes embodied on the removable data storage devices 1210 may be loaded into various memory elements 1230 located within the touch screen controller 1240 to configure the touch screen system 1200 for operation in accordance with the invention. The computer programs 1220 comprise instructions which, when read and executed by the touch screen system processor 1250 of FIG. 12, cause the touch screen system 1200 to perform the steps necessary to execute the steps or elements for detecting the location of a touch on a touch screen in accordance with the principles of the present invention.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A method for determining a touch location of a touch on a touch screen, comprising:

developing a first reference level for a force responsive touch signal;

developing a second reference level for the force responsive touch signal; and determining the touch location by calculating a difference between the touch signal and at least one of the first and second reference levels;

wherein developing the second reference level comprises using an extrapolated value as the second reference level, and wherein using an extrapolated value as the second reference level comprises:

acquiring a first touch signal sample during a quiescent period;

acquiring a second touch signal sample during the quiescent period, the second touch signal sample acquired a predetermined number of sample times after the first touch signal sample;

determining a rate of change of the touch signal during the quiescent period using the first and the second touch signal samples;

extrapolating a value of the touch signal based on the first touch signal sample, the second touch signal sample and the rate of change of the touch signal; and using the extrapolated value as the second reference level.

2. A method for determining a touch location of a touch on a touch screen, comprising:

developing the first reference level for a force responsive touch signal;

developing a second reference level for the force responsive touch signal; and determining the touch location by calculating a difference between the touch signal and at least one of the first and second reference levels;

wherein developing the second reference level comprises using an interpolated value as the second reference level, wherein using an interpolated value as the second reference level comprises:

acquiring a first touch signal sample during a quiescent period;

acquiring a second touch signal sample when the touch signal returns to a quiescent state following application of a touch;

determining a rate of change of the touch signal between the first touch signal sample and the second touch signal sample;

interpolating a value of the touch signal based on the first touch signal sample, the second touch signal sample and the rate of change of the touch signal; and using the interpolated value as the second reference level.

3. A method for determining a touch location of a touch on a touch screen, comprising:

developing a first reference level for a force responsive touch signal;

developing a second reference level for a force responsive touch signal; and determining the touch location by calculating a difference between the touch signal and at least one of the first and second reference levels;

wherein determining the touch location includes transitioning from using the first reference level to using the second reference level, wherein transitioning from using the first reference level to using the second reference level comprises calculating X and Y touch location coordinates as:

$$X = WX_{ref2} + (1-W)X_{ref1},$$

$$Y = WY_{ref2} + (1-W)Y_{ref1},$$

where:

W is a weighting factor, $X_{ref1}$ and $Y_{ref2}$ are touch location coordinates calculated using the second reference level, and $X_{ref1}$ and $Y_{ref1}$ are touch location coordinates calculated using the first reference level.

4. The method of claim 3, wherein transitioning from using the first reference level to using the second reference level comprises:

calculating touch signal location values using each of the first and second reference levels;

assigning weights to each touch signal location value; and determining the touch location based upon the weighted touch signal location values.

5. The method of claim 4, wherein the weights assigned to each touch signal location value vary with distance as the touch is moved across the touch screen.

6. The method of claim 3, wherein transitioning from using the first reference level to using the second reference level comprises eliminating an effect associated with either the first or the second reference level from the touch location determination when the touch is moved a predetermined distance.

7. The method of claim 3, wherein transitioning from using the first reference level to using the second reference level comprises eliminating an effect associated with either the first or the second reference level from the touch location determination after a predetermined time interval.

8. The method of claim 3, wherein the weighting factor, W, is calculated as:

$$W = \text{Max}\left[1 - \frac{D}{0.2S}, 0\right]$$

where D is a greatest distance traveled in either an X direction of a Y direction, and S is a size of the touch screen.

9. The method of claim 3, wherein the weighting factor, W, declines linearly from 1 to 0 over a period of one second.

10. A method of establishing a reference level for a touch signal, comprising:
sensing a quiescent touch signal prior to an application of a touch force;
detecting a touch signal responsive to the application of the touch force; and
establishing a reference level for the touch signal based on one or more values of the touch signal acquired contemporaneously with the detection of the touch force, the reference level representing a zero applied force reference condition, wherein a difference calculated between the reference level and the touch signal is used to determine a location of the touch force;
wherein establishing the reference level comprises establishing the reference level based on a particular time at which touch location information is obtained, wherein establishing the reference level comprises:
detecting a first quiescent touch signal, the first quiescent touch signal representing the force responsive touch signal before the touch is applied to the touch screen;
detecting a second quiescent touch signal, the second quiescent touch signal representing the force responsive touch signal after the touch is removed from the touch screen;
determining an interpolated touch signal between the first and the second quiescent touch signals; and
using a value of the interpolated touch signal at the particular time at which the touch location is determined as the reference level.

11. The method of claim 10, wherein establishing the reference level comprises:
detecting a quiescent touch signal, the quiescent touch signal representing the force responsive touch signal during a period in which no touch force is applied to the touch screen;
extrapolating the quiescent touch signal to the particular time of the touch location measurement; and
using a value of the extrapolated quiescent touch signal at the particular time at which the touch location is determined as the reference level.

12. The method of claim 10, wherein the second quiescent touch signal is detected if a touch signal sample is below a predetermined threshold and at least one subsequent touch signal sample has a value less than the touch signal sample.

13. The method of claim 10, wherein the second quiescent touch signal is detected if a predetermined number of successive samples remain within a predetermined range of values.

* * * * *

UNITED STATES PATENT AND TRADEMARK OFFICE
CERTIFICATE OF CORRECTION

PATENT NO. : 7,532,202 B2  Page 1 of 1
APPLICATION NO. : 10/142118
DATED : May 12, 2009
INVENTOR(S) : Jerry B. Roberts It is certified that error appears in the above-identified patent and that said Letters Patent is hereby corrected as shown below:

Column 10
Line 13; delete "$F^{Tz}$" and insert -- $F_{Tz}$ -- therefor.

Column 18
Line 42; Claim 3; delete "$X_{ref1}$" and insert -- $X_{ref2}$ -- therefor.

Column 19
Line 9; Claim 8; delete "of a Y" and insert -- or a Y -- therefor.

Signed and Sealed this

First Day of September, 2009

David J. Kappos
*Director of the United States Patent and Trademark Office*